Aug. 29, 1967 Z. P. J. SZEPESI 3,339,075

SOLID STATE DISPLAY DEVICE FOR AMPLIFYING OR CONVERTING INPUT RADIATION INCLUDING A FIELD EMISSIVE LAYER

Filed Aug. 12, 1963

WITNESSES:

John G. Chopp

James F. Young

INVENTOR

Zoltan P. J. Szepesi

BY

Charles F. Renz

ATTORNEY 3,339,075

SOLID STATE DISPLAY DEVICE FOR AMPLIFYING OR CONVERTING INPUT RADIATION INCLUDING A FIELD EMISSIVE LAYER

Zoltan P. J. Szepesi, Horseheads, N.Y., assignor to Westinghouse Electric Corporation, East Pittsburgh, Pa., a corporation of Pennsylvania Filed Aug. 12, 1963, Ser. No. 301,502
6 Claims. (Cl. 250—213)

This invention relates to radiation sensitive devices for amplifying an optical image or converting it into a different wave band output radiation.

Radiation devices are known in which an input radiation image is directed onto a single layer of material and by applying an alternating electric field across the layer of material, an output radiation image is obtained which may be of a different wave length than the input radiation and may include intensification of the input radiation image. These materials are generally known in the art as photoelectroluminescent materials and the phenomena referred to as field enhancement of luminescence.

Another particular device which is of interest in this invention are those devices incorporating field emission elements which exhibit field dependent secondary electron emission. These elements utilize a thin dielectric film such as magnesium oxide. By applying a high D-C field across the film while the surface is bombarded with primary electrons, it is found that a secondary emission ratio of 10,000 can be obtained. It is further noted that secondary electrons, liberated within the material, will be accelerated to such high velocities that an avalanche effect will occur. Another material which is of particular interest in this invention is an electroluminescent material. The electroluminescent materials are caused to luminesce when subjected to an electric field provided by a difference of potential applied across the material by electrodes.

It is accordingly an object of this invention to provide a device in which the electron amplification properties of a field emitter are combined with certain light producing elements such as electroluminescent or photoelectroluminescent layers to provide an improved device for amplifying or converting radiation inputs.

It is another object of the present invention to provide an improved solid state radiation sensitive device.

It is another object of this invention to provide a solid state imaging device for amplification of a radiation input.

It is yet another object of this invention to provide a thin solid state amplification device for converting a first radiation input into a second radiation output.

Briefly, the present invention accomplishes the above-cited objects by providing a solid state image intensification device utilizing a laminated structure which is sensitive to an input radiation image for modifying the field across a field dependent secondary emission electrode and in which the electron emission from the field emission electrode is utilized to stimulate or enhance a radiation output image generated within an electroluminescent or photoelectroluminescent layer within the laminated structure.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings in which.

Figure 1:
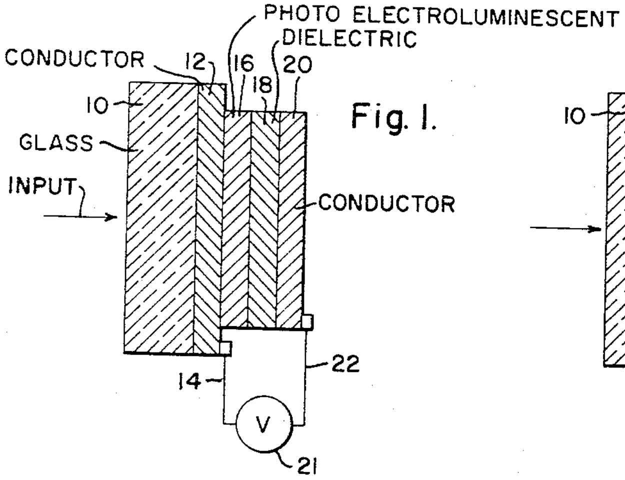
FIG. 1 is a cross-sectional view of one embodiment of this invention.

Referring in detail to FIG. 1, there is shown a radiation amplifying or converting device, consisting of a support layer 10 of the suitable material such as glass which is transmissive to input radiations. On one face of the support member 10 there is provided a layer 12 of an electrically conductive material such as stannic oxide which is also transmissive to input radiations. The conductive layer 12 may be deposited on the glass in any well-known manner such as by reaction of tin chloride on a heated glass surface. The layer 12 is of a thickness of about 0.1 micron and a terminal 14 is connected to the conductive layer 12 for application of suitable potential.

A layer 16 of a suitable photoelectroluminescent material, such as ZnS:Mn, Cl is provided on the layer 12. Suitable photoelectroluminescent materials as well as suitable electroluminescent material are disclosed in an article entitled, "Electroluminescence and Field Effects in Phosphors," by Henry F. Ivy in the December 1957 issue of The Journal of the Electrochemical Society. The layer 16 may be deposited on the layer 12 by the well-known techniques of vapor deposition, described in an article entitled, "Transparent Phosphor Coatings," Journal of Optical Society of America, vol. 45, pages 493–497, 1955.

A layer 18 of a suitable dielectric material such as magnesium oxide is deposited on the layer 16. Suitable materials are disclosed in an article entitled, "The Mechanism of Self-Sustained Electron Emission From Magnesium Oxide," by D. Dobischek, H. Jacobs and J. Freely in the Physical Review, volume 91, pages 804–812, No. 4, Aug. 15, 1953. The layer 18 may be deposited by evaporating magnesium in an oxygen atmosphere of 10 to 100 microns. Subsequent heating in a higher oxygen pressure completes the oxidization of magnesium. The layer 18 may be of a thickness of a few microns.

Positioned on the exposed surface of the layer 18 is a second electrically conductive layer 20 which may be of a suitable electrical conductive material such as gold which is substantially transmissive to the radiation generated within the photoelectroluminescent layer 16. The gold may be evaporated to form the thin layer 20. A terminal 22 is connected to the layer 20 and an alternating voltage source 21 is provided between the terminal 22 and the terminal 14. The potential of the voltage source 21 will vary with dimensions of the device but in the specific embodiment described above and an alternating voltage of about 300 volts and of a frequency of about 2,000 cycles per second would provide a suitable output. It should also be noted here that the layer 18 of magnesium oxide should be thin enough to be transmissive to the radiations generated within the layer 16.

The operation of the device shown in FIG. 1 would be substantially as follows: The input radiation, which might be in form of X-rays or some other type radiation, is directed through the transmissive support layer 10 and the electrical conductive layer 12 and would excite electrons in the photoelectroluminescent layer 16 into the conduction band. These electrons would then be accelerated in the high field cathode region of the photoelectroluminescent layer 16 and a first portion of these electrons would excite electrons from the activation centers within the photoelectroluminescent layer 16 by collision. In addition, a second portion of the electrons would pass through the layer 16 and would arrive at the field emissive layer 18 where they would be multiplied by the avalanche effect with proper voltages. At this specific time, the terminal 22 would be at a high positive potential with respect to the terminal 14. After the preliminary excitation of secondary emission electrons in the layer 18, the field generated by the voltage source 21 across the terminals 14 and 22 would be reversed. The electrons generated in layer 18 would be directed back into the photoelectroluminescent layer 16 which would in turn excite more electrons from the activation centers by collision and also fall back into the activation centers and thereby give off radiation from the material in layer 16. In this manner, the resulting radiation or light output from the layer 16 would increase and several cycles of the voltage source 21 between the terminals 14 and 22 are needed until an equilibrium value is substantially obtained.

Figure 2:
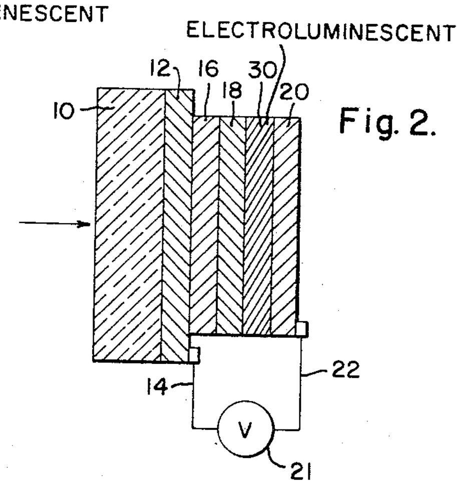
FIG. 2 is a cross-sectional view of another embodiment of this invention.

FIGURE 2 is a modified embodiment of FIGURE 1 in which a layer 30 of a suitable electroluminescent material is positioned between the layer 18 and 20. A suitable electroluminescent material for the layer 30 would be a material such as ZnS, ZnSe or CdS. It is possible to embed the electroluminescent phosphor material within an insulating material such as polyvinyl-chloride-acetate. The light output from this electroluminescent layer 30 is dependent upon the field applied to the layer. It is also possible to use an injection type electroluminescent phosphor such as gallium phosphide, which does not primarily rely on the field impressed across the layer, but instead relies on injection of carriers such as electrons into the phosphor in order to stimulate light emission.

The operation of the device illustrated in FIGURE 2 provides that the input radiation such as a light image is directed through the layers 10 and 12 to impinge on the photoelectroluminescent layer 16. The input radiation produces initial free electrons which go into the conduction band of the photoelectroluminescent layer 16. These electrons are in turn accelerated by the high field cathode region of the photoelectroluminescent layer 16. A first portion of these electrons excite electrons from the activation centers within the photoelectroluminescent layer 16 by collision and a second portion of them will arrive in the field emitting layer 18 and generate secondary electrons. By proper phasing of the frequency of the voltage source 21 connected across the terminals 14 and 22, as in FIGURE 1, these electrons excite both the electroluminescent layer 30 and the photoelectroluminescent layer 16 to provide a radiation output image corresponding to the input image.

Figure 3:
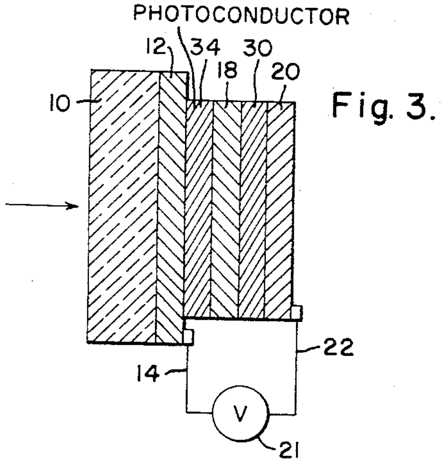
FIG. 3 is a cross-sectional view of yet another embodiment of this invention.

In FIGURE 3, a modified light amplifier is shown and consists of the support layer 10, the electrical conductive layer 12, a layer 34 of a suitable photoconductive material such as cadmium sulfide, the field emitter layer 18, the electroluminescent layer 30 and the electrically conductive layer 20. The input radiation image is directed onto the photoconductive layer 34. The photoconductive layer 34 is capable of producing in response to the input or incident radiation a change in electrical conductivity through the material. In the particular application, the photoconductive material in layer 34 decreases in resistivity in response to input radiation and therefore the field across the field emitter layer 18 i- increased to a point where the material in layer 18 will start to emit electrons. With the proper field connected across the terminals 14 and 22 so that the terminal 22 is at a more positive potential, these electrons will be injected into the electroluminescent layer 30 causing emission of light therefrom corresponding to the input radiation image.

Figure 4:
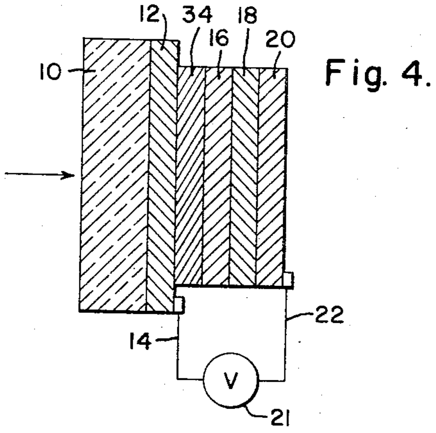
FIG. 4 is a cross-sectional view of the further embodiment of this invention.

FIGURE 4 is a modification of the device illustrated in FIGURE 3. The structure in FIGURE 4 includes the support layer 10, the conductive layer 12, the photoconductive layer 34, the photoelectroluminescent layer 16, the field emissive material layer 18 and a conductive layer 20 in the order named. The input radiation image is directed onto the photoconductive layer 34 and reduces the resistance of the material which in turn increases the field impressed across the field emitting layer 18 causing it to emit electrons which in turn stimulate emission from the photoelectroluminescent layer 16.

Figure 5:
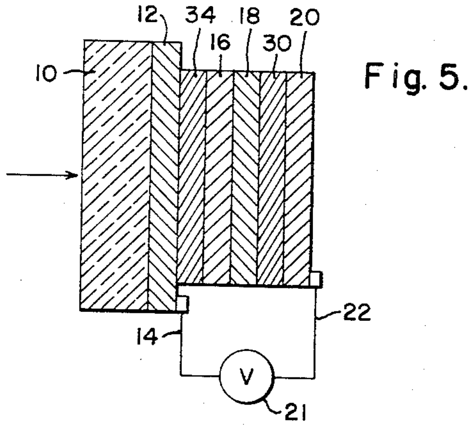
FIG. 5 is a cross-sectional view of still a further embodiment of this invention.

FIGURE 5 is another modified solid state device comprising in the order named the support member 10, the conductive layer 12, the photoconductive layer 34, the photoelectroluminescent layer 16, the field emissive layer 18, the electroluminescent layer 30 and the conductive layer 20. The voltage is again impressed across the terminals 14 and 22 by the voltage source 21. In the operation of the device, the input radiation is directed onto the photoconductive layer 34 which modifies the conductance of the material to reduce the resistance and therefore increase the field impressed across the field emissive layer 18 causing it to emit electrons which are injected into the electroluminescent layer 30. The electron emission from the field emissive layer 18 corresponds to the input radiation and the light output from the electroluminescent layer 30 will correspond to the input radiation.

In all the devices described above, it is necessary to match the capacitive and ohmic components of the different layers. It is also necessary to have appropriate barrier layers or junctions between the layers. In addition, it is necessary to apply a voltage with proper amplitude and frequency.

While there have been shown and described what are at present considered to be the preferred embodiments of the invention, modifications thereto will readily occur to those skilled in the art. It is not desired, therefore, that the invention be limited to the specific arrangements shown and described and is intended to cover in the appended claims all such modifications as fall within the true spirit and scope of the invention.

I claim as my invention:

1. A solid state radiation converting device comprising a layer of photoelectroluminescent material, a layer of material exhibiting the property of emission of electrons in response to a high field impressed thereacross in intimate contact with said photoelectroluminescent layer and means for impressing a field across said photoelectroluminescent layer and said electron emissive layer.

2. A solid state radiation converting device comprising a layer of field emissive material which exhibits the property of emission of electrons in response to a high field impressed thereacross, a layer of a phosphor material positioned in intimate contact with one surface of said electron emissive layer which exhibits the property of emission of light in response to low energy electron injection into said phosphor layer and electrical conductive layers positioned on the exposed surfaces of said phosphor layer and said field emissive layer and means for impressing a difference in potential on said conductive layers to provide a field across said phosphor layer and said electron emissive layer.

3. A solid state radiation converting device comprising a layer of photoelectroluminescent material, an electrical conductive layer provided on one surface of said photoelectroluminescent layer, said conductive layer transmissive to an input radiation, a layer of material exhibiting the property of emission of electrons in response to a high field impressed thereacross deposited on the exposed surface of said photoelectroluminescent layer, a layer of electroluminescent material exhibiting the property of emission of radiation in response to electron injection into one surface of said electroluminescent layer, an electrically conductive layer positioned on the exposed surface of said electroluminescent layer transmissive to radiations generated by said electroluminescent layer in response to stimulation thereof and voltage means connected across said conductive layers for impressing a field across the sandwich of layers consisting of said photoelectroluminescent layer, said electron emissive layer and said electroluminescent layer.

4. A radiation solid state converter device comprising a rigid support plate of a material transmissive to input radiation, an electrically conductive coating on one surface of said support plate transmissive to input radiation, a layer of photoconductive material on said conductive coating responsive to said input radiation, a layer of material on said photoconductive layer exhibiting the property of electron emission in response to a high electric field, a layer of electroluminescent material provided on said electron emissive layer exhibiting the property of emission of light in response to electron injection into said electroluminescent layer and a layer of electrical conductive material provided on said electroluminescent layer transmissive to the radiation emitted by said electroluminescent layer.

5. An image translation device comprising a large area electron source, said electron source comprised of an insulating material exhibiting the property of emission of electrons in response to a high field being impressed across said electron emissive layer, a photoelectroluminescent layer deposited on one surface of said electron emissive layer and exhibiting the property of the emission of light in response to input radiation stimulation and field stimulation, electrically conductive electrodes positioned on the exposed surfaces of said electron emissive layer and said photoelectroluminescent layer and a voltage source connected across said conductive electrodes for establishing a field across said electron emissive layer and said photoelectroluminescent layer.

6. An image device comprising a large area electron source, said electron source comprised of a layer of material exhibiting the property of the emission of electrons in response to an electric field established within said electron emissive layer, a radiation input sensitive layer disposed on one side of said electron emissive layer, a radiation output layer disposed on the opposite surface of said electron emissive layer and responsive to electron injection from said electron emissive layer and a field impressed thereacross, first and second electrically conductive layers provided on the exposed surfaces of said light input layer and output layer respectively and a voltage source connected across said first and second conductive layers for impressing a field across said electron source layer, said input layer and said output layer.

References Cited

UNITED STATES PATENTS

| | | | |
|---|---|---|---|
| 2,594,740 | 4/1952 | De Forest et al. | 250—213 |
| 2,906,884 | 9/1959 | Gill | 250—213 |
| 2,931,914 | 4/1960 | Orthuber et al. | 250—213 |
| 2,970,219 | 1/1961 | Roberts et al. | 250—213 |
| 2,988,647 | 6/1961 | Duinker et al. | 250—213 |
| 3,107,303 | 10/1963 | Berkowitz | 250—213 |

OTHER REFERENCES

Destriau et al., "Electroluminescence and Related Topics," Proceedings of the I.R.E. 43(12): pp. 1911–1940 (pp. 1933 and 1937 relied upon), December 1955.

Ivey, "Electroluminescence and Field Effects in Phosphors," Journal of the Electrochemical Society, 104(12): pp. 740–748.

Weimer, "Solid State Image Intensified Pickup Tubes," RCA Technical Notes (RCA TN No. 132), Scientific Library date Mar. 12, 1958.

RALPH G. NILSON, *Primary Examiner.*

M. A. LEAVITT, *Assistant Examiner.*